United States Patent
Ono et al.

(10) Patent No.: US 6,545,778 B2
(45) Date of Patent: Apr. 8, 2003

(54) HOLOGRAPHIC DISPLAY DEVICE AND METHOD FOR PRODUCING A TRANSMISSION DIFFUSION HOLOGRAM SUITABLE FOR IT

(75) Inventors: Motoshi Ono, Yokohama (JP); Norihito Nakazawa, Yokohama (JP)

(73) Assignee: Asahi Glass Company, Limited, Tokyo (JP)

(*) Notice: Subject to any disclaimer, the term of this patent is extended or adjusted under 35 U.S.C. 154(b) by 0 days.

(21) Appl. No.: 09/976,161

(22) Filed: Oct. 15, 2001

(65) Prior Publication Data
US 2002/0021461 A1 Feb. 21, 2002

Related U.S. Application Data (63) Continuation of application No. PCT/JP00/02959, filed on May 9, 2000.

(30) Foreign Application Priority Data

| May 10, 1909 | (JP) | 11-129114 |
| Dec. 24, 1999 | (JP) | 11-367327 |
| Apr. 6, 2000 | (JP) | 2000-105318 |

(51) Int. Cl.$^7$ ................................. G03H 1/00
(52) U.S. Cl. .................. 359/13; 359/15; 359/8; 359/14
(58) Field of Search .................. 359/3, 13, 14, 359/15, 28, 30; 345/7, 32, 8, 9; 349/11; 396/288

(56) References Cited

U.S. PATENT DOCUMENTS

| 5,231,379 A | * | 7/1993 | Wood et al. ............... 340/980 |
| 5,475,512 A | * | 12/1995 | Nakazawa ................... 359/13 |
| 6,075,579 A | * | 6/2000 | Ueda et al. .................. 359/15 |
| 6,115,153 A | * | 9/2000 | Tomita et al. .......... 250/237 G |
| 6,122,080 A | * | 9/2000 | Ogata ......................... 359/15 |
| 6,198,554 B1 | * | 3/2001 | Kanda et al. .................. 359/1 |
| 6,327,084 B1 | * | 12/2001 | Nishikawa et al. ............ 345/7 |
| 2001/0046072 A1 | * | 11/2001 | Takada ........................ 359/15 |

FOREIGN PATENT DOCUMENTS

| EP | 479 490 | 4/1992 | |
| JP | 5-134593 | 5/1993 | |
| JP | 7-234374 | 9/1995 | |
| JP | 07281583 A | * 10/1995 | ............ G03H/1/02 |
| JP | 8-91094 | 4/1996 | |
| JP | 9-179058 | 7/1997 | |
| JP | 10-68946 | 3/1998 | |
| JP | 10068946 A | * 3/1998 | ......... G02F/1/1335 |

OTHER PUBLICATIONS

F. L. Pedrotti, L. S. Pedrotti, "Introduction to Optics", Prentice Hall, New Jersey, 1993, pp. 391–404.*

* cited by examiner

Primary Examiner—Cassandra Spyrou
Assistant Examiner—Arnel C. Lavarias
(74) Attorney, Agent, or Firm—Oblon, Spivak, McClelland, Maier & Neustadt, P.C.

(57) ABSTRACT

A holographic display device, e.g. for a vehicle, which reduces a color of hologram reflection toward the outside of the vehicle or a color of hologram transmission toward the inside of the vehicle generated at a hologram installation portion of a wind-proof glass, and which further reduces an external light noise. Light from a display element is transmitted through an imaging optical component to form a display image on a transmission diffusion hologram provided to a wind-proof glass, and the display image is reflected on the surface on the vehicle outer side of the wind-proof glass for visual recognition by an observer. The above transmission diffusion hologram is produced by diffused light, which is transmitted through a diffusion optical component, being made to fall on one side of a hologram photosensitive material.

8 Claims, 10 Drawing Sheets

Fig. 8(A)
L=10mm, Diffusion angle ±10°

Fig. 8(B)
L=10mm, Diffusion angle ±90°

Fig. 8(C)
L=150mm, Diffusion angle ±10°

Fig. 8(D)
L=150mm, Diffusion angle ±90°

HOLOGRAPHIC DISPLAY DEVICE AND METHOD FOR PRODUCING A TRANSMISSION DIFFUSION HOLOGRAM SUITABLE FOR IT

This application is a continuation of PCT/JP00/02959, filed on May 9, 2000.

BACKGROUND OF THE INVENTION

1. Field of the Invention

The present invention relates to a holographic display device which has a hologram to be used for e.g. a combiner provided to a fixed substrate.

2. Discussion of Background

As a method of displaying information to e.g. a driver in a vehicle, a head-up display (hereinafter referred to as HUD) has become used in recent years. HUD is such a device that a display image containing information of instruments, projected from a light-emitting display means such as a liquid crystal display device, is reflected on a combiner consisting of e.g. a half mirror or a reflection hologram provided to a wind-proof glass which is a windshield fixed on a forward portion of a vehicle as a fixed substrate, so that a display virtual image is visually recognized by a driver.

According to HUD, a driver can read information substantially without moving line of sight in a driving state.

Particularly one which employs a reflection hologram as a combiner is effective as a combiner of HUD, since it has such characteristics that a display image containing information from a light-emitting display means can be diffracted toward a driver and formed on an optional position on the forward portion of a hologram, and a high brightness virtual image display can be obtained without impairing brightness in the forward field of view, i.e. foreground brightness.

However, in the case of a combiner employing a reflection hologram, it is a virtual image that a driver observes, and the position of the display virtual image changes when the position of the eyes move, and how the image deforms also changes. Accordingly, the shape of the display virtual image variously changes during driving, and not only does a driver feel uncomfortable but also visual recognizability of the display significantly decreases.

Figure 14:
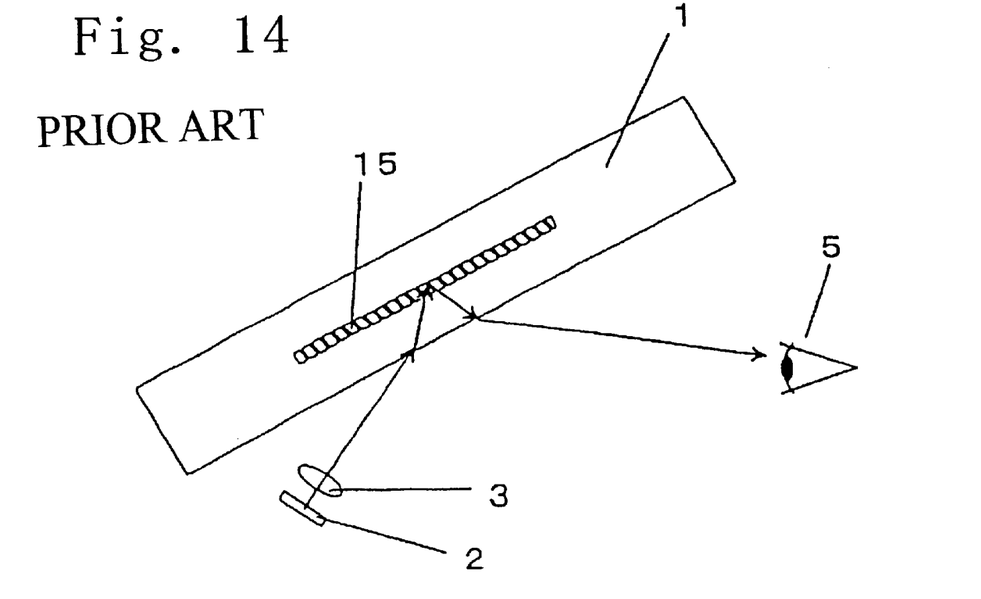
FIG. 14 is a cross sectional view illustrating a display device for a vehicle employing a conventional hologram.

FIG. 14 is a cross-sectional view illustrating a display device for a vehicle using a conventional reflection hologram. With a conventional display device for a vehicle as disclosed in JP-A-8-91094, as illustrated in FIG. 14, a reflection diffusion hologram 15 is used for a combiner provided to a wind-proof glass 1, light containing information from a display element 2 is formed as an image on the surface of the reflection diffusion hologram 15 by means of an imaging optical component 3 such as a lens, and the image is diffracted by the reflection diffusion hologram 15 so that a real image is visually recognized by an observer 5. Visual recognizability is high when the display image is a real image as compared with a virtual image.

However, in a case where the above reflection diffusion hologram is used, light having a certain wavelength of external light such as solar light is reflected on the reflection diffusion hologram, and a portion of the reflection diffusion hologram may look colored from the outside of the vehicle in some cases, and such is unfavorable in view of design of a vehicle. Further, simultaneously, since the hologram portion reflects light having a certain wavelength of external light, complementary color to the reflected color may be observed by a person in a vehicle, thus making the person feel uncomfortable.

Further, there is such a problem that external light such as solar light is reflected on the interface with the air on the vehicle inner side of the wind-proof glass, and the reflected light is diffracted by a hologram and reaches the eyes of a driver (hereinafter this phenomenon will be referred to as external light noise), and such a phenomenon significantly decreases visual recognizability of the driver.

SUMMARY OF THE INVENTION

It is an object of the present invention to overcome the above-described drawbacks of the prior art and to provide a holographic display device which can improve visual recognizability.

The present invention provides a holographic display device which forms a display image of light containing information projected from a light-emitting display means, on a diffusion hologram provided on a fixed substrate, wherein the above diffusion hologram is a transmission diffusion hologram, and the above display image transmission-wise diffracted by the above diffusion hologram is reflected on the surface of the above fixed substrate for visual recognition.

The present invention further provides the above-mentioned holographic display device, wherein the above fixed substrate is a window glass of a vehicle.

The present invention further provides the above-mentioned holographic display device, wherein the visible light transmittance is at least 70% when the above transmission diffusion hologram is provided to the above fixed substrate.

The present invention further provides the above-mentioned holographic display device, wherein the above fixed substrate is a glass of a show window.

The present invention further provides the above-mentioned holographic display device, wherein a transparent substrate having non-reflection coating applied thereto is provided to the light-emitting display means side of the above transmission diffusion hologram.

The present invention further provides the above-mentioned holographic display device, wherein a high-reflection coating is applied to the glass of a show window on the side to which no transmission diffusion hologram is provided.

The present invention further provides the above-mentioned holographic display device, wherein the hologram is recorded on an acrylic photopolymer.

The present invention further provides the above-mentioned holographic display device, wherein the light-emitting display means is a liquid crystal display element.

The present invention further provides a method for producing a transmission diffusion hologram, which comprises disposing a diffusion optical component having light diffusion properties on one side of a hologram photosensitive material so as to produce a hologram only by a diffused light transmitted through or reflected on the above diffusion optical component.

The present invention further provides the above-mentioned method for producing a transmission diffusion hologram, wherein the above diffusion optical component has an angle of light diffusion within ±20°.

The present invention further provides the above-mentioned method for producing a transmission diffusion hologram, wherein the above diffusion optical component and the above hologram photosensitive material are disposed so that they are parallel to each other, and the distance between them is within 30 mm.

The present invention further provides the above-mentioned method for producing a transmission diffusion hologram, wherein a deep color glass which absorbs light is disposed in order of diffusion optical component/hologram photosensitive material/deep color glass.

The present invention further provides the above-mentioned method for producing a transmission diffusion hologram, wherein the above diffusion optical component is a frosted glass.

The present invention still further provides the above-mentioned method for producing a transmission diffusion hologram, wherein the above hologram photosensitive material is an acrylic photopolymer.

When a holographic display device of the above constitution is applied to a vehicle, a color of reflection toward the outside of the vehicle and a complementary color toward the inside of the vehicle are eliminated at a hologram installation portion, and a desirable display device in view of design and visual recognizability can be realized, and external light noise can be reduced. Such is preferred to use in view of safety when a wind-proof glass is used as a window glass. Further, by using the above-described transmission diffusion hologram, halation which is a phenomenon such that light is generated around a light source when external light falls thereon, can be prevented and the visible light transmittance improves. The diffusion angle of the above diffusion optical component is preferably within ±20°, more preferably within ±10°, taking both prevention of the halation and improvement of the visible light transmittance into consideration.

DETAILED DESCRIPTION OF THE PREFERRED EMBODIMENTS

In the present invention, a transmission diffusion hologram is provided, for example, to a window glass of a vehicle. This window glass may be any of a wind-proof glass, a side glass and a rear glass.

A wind-proof glass is preferred since various driving information which constantly changes can be provided to a driver, and further, a driver can drive safely without any influence of external light noise when driving information is provided.

Figure 1:
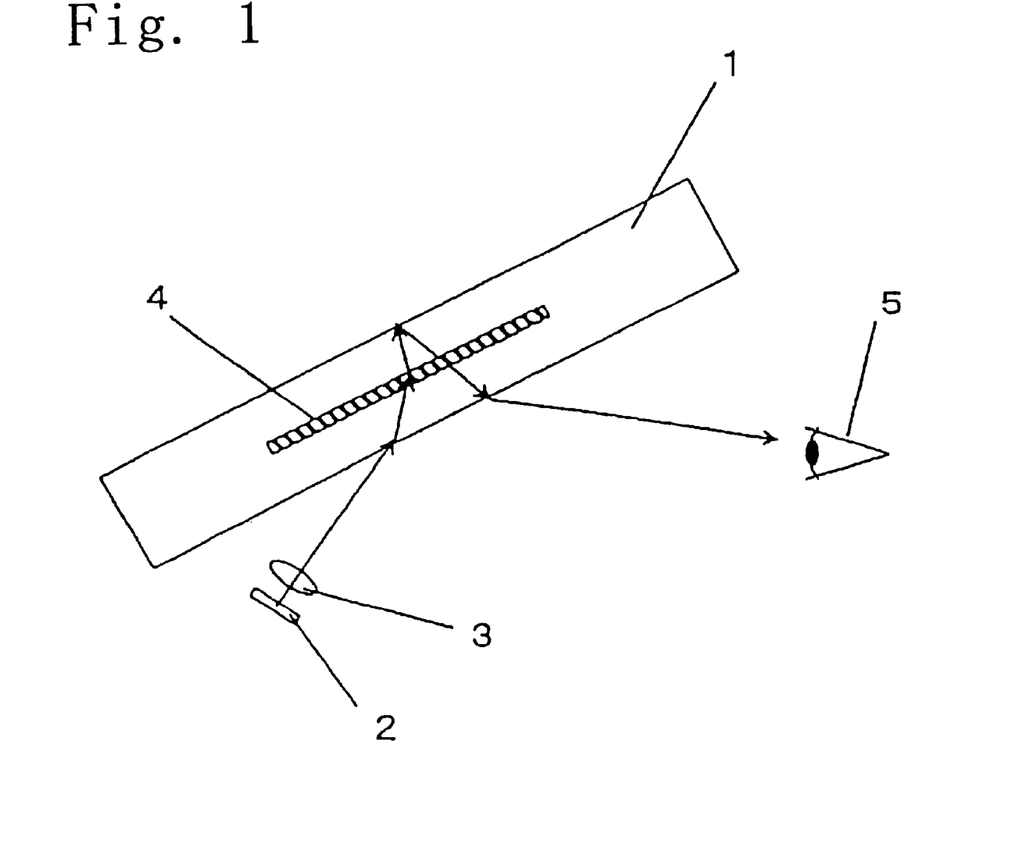
FIG. 1 is a cross-sectional view illustrating one example of a holographic display device.

Now, the present invention will be explained in detail with reference to Figs. with respect to a case where the window glass is a wind-proof glass. FIG. 1 is a cross-sectional view illustrating a holographic display device according to a first embodiment of the present invention.

An imaging optical component 3 is disposed between a display element 2 and a wind-proof glass 1, and forms a display image of light containing information from the display element 2 on a transmission diffusion hologram 4 provided to the wind-proof glass 1. The display image formed on the transmission diffusion hologram 4 is transmission-wise diffracted by the transmission diffusion hologram 4 and its direction of movement is changed, and the display image is reflected on the interface with the air on the vehicle outer side of the wind-proof glass, and visually recognized by an observer 5.

As the imaging optical component 3, a lens employing refraction of light, a concave mirror employing reflection (the display element 2 is dislocated in this case) or a hologram employing diffraction may, for example, be used. In any case, various imaging optical components which form an image of light containing information from a display element on a transmission diffusion hologram provided to a wind-proof glass can be used. Further, such imaging optical components may be combined, or such an imaging optical component may be integrated with a display element. The light-emitting display means is one including the display element 2, the imaging optical component 3 and the like.

Further, imaging position of the display image in the present invention is assumed to be on the surface of the transmission diffusion hologram, but in the present invention, a reflected image from the surface of the wind-proof glass is observed, and accordingly the position may not be strictly on the surface of the hologram and may be slightly shifted to the forward or backward portion of the hologram surface. It is important in the present invention to form a display image of light containing information as a real image on the hologram (including neighborhood thereof).

The transmission diffusion hologram has a wider diffraction wavelength width as compared with a reflection diffusion hologram, and thus diffracted light disperses.

Accordingly, coloring (outside of the vehicle) of the hologram portion due to reflected light and generation of complementary color (inside of the vehicle) due to reflection, which are problems with a reflection diffusion hologram, can be reduced.

The light-emitting display means in the present invention may be any one having a function to emit and display light. For example, a so-called light-receiving display element such as a liquid crystal display element and a light source such as a hot-cathode tube, a cold-cathode tube, a halogen lamp or LED may be combined to obtain a display element, and an imaging optical component may be combined with this display element. Otherwise, one having functions of them together may be mentioned, and various different examples may be considered.

As the liquid crystal display element, a transmission type twisted nematic liquid crystal display element or a super twisted nematic liquid crystal display element may, for example, be preferably used.

Otherwise, an imaging optical component may be combined with a self-luminous display element such as a fluorescent display tube. The self-luminous display element may be one which patterns to align a light-emitting element such as LED and which generates information such as specific characters as light.

Figure 2:
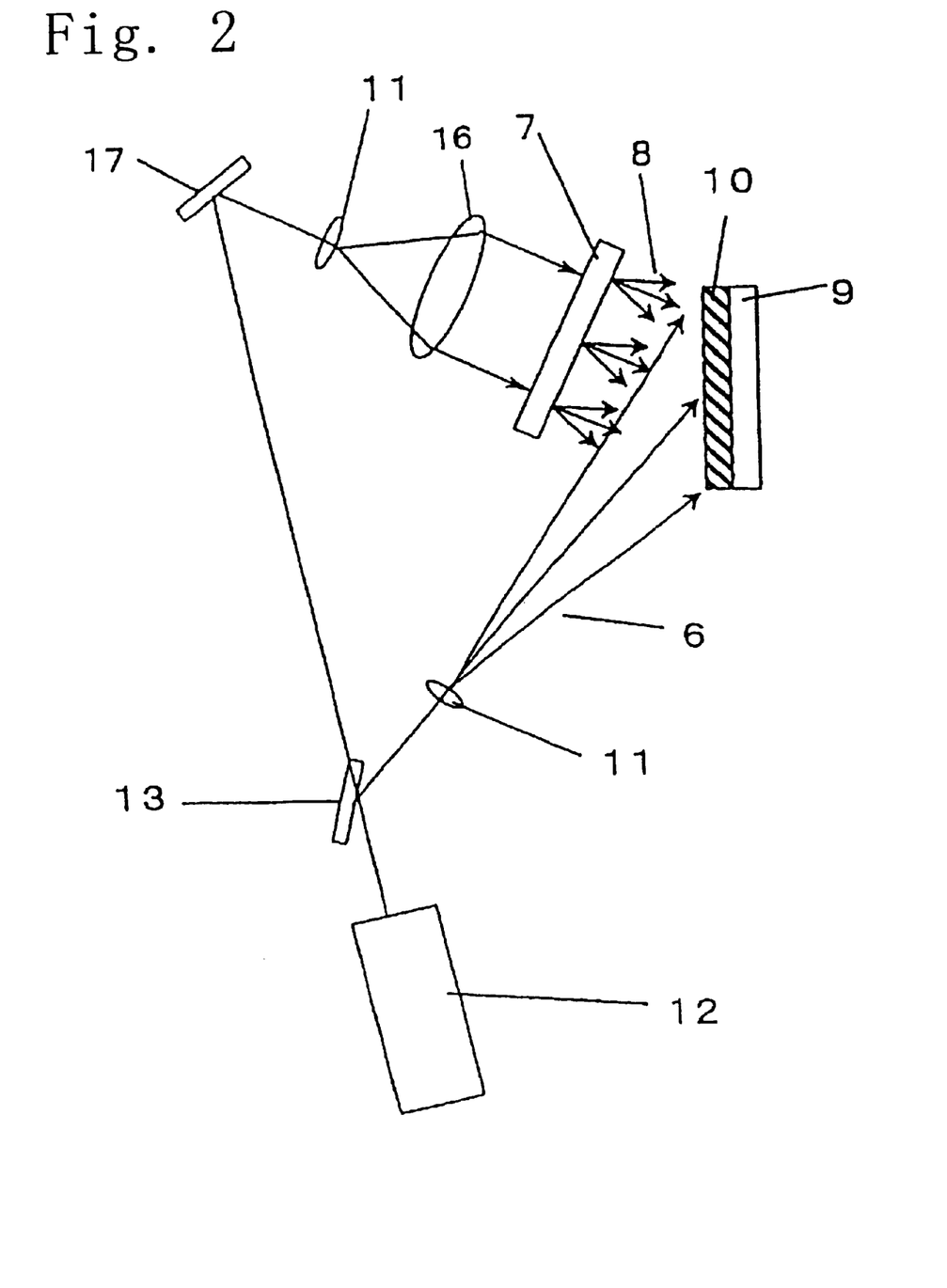
FIG. 2 is a conceptual plan view illustrating one example of a method for producing a diffusion type hologram which is used in a first embodiment of the present invention.

As the transmission diffusion hologram in the present invention, a hologram recorded in an optical setup as illustrated in FIG. 2 may, for example, be used. FIG. 2 is a conceptual plan view illustrating one example of a method for producing a transmission diffusion hologram which is used in a first embodiment of the present invention, and each of reference beam 6 and object beam 8 transmitted through a diffusion optical component 7 such as a frosted glass is made to fall on a hologram photosensitive material 10 attached to a substrate glass 9 from the same side, and the resulting interference fringes are recorded.

Reference beam 6 and object beam 8 are made in such a manner that laser beam emitted from a laser oscillator 12 is split into two by a beam splitter 13, one split light is reflected on a mirror 17, made into diffused light by a spatial filter 11, and made into collimated beams by a collimator lens 16, and the other split light is made into diffused light by a spatial filter 11, respectively.

In the case of production of a hologram as illustrated in FIG. 2, the angles of incidence of the reference beam 6 and the object beam 8 are usually made to correspond to the angle of incidence from a light source to a hologram and the angle of emission from the hologram to an observer in FIG. 1, respectively (the angle is an angle formed with a normal drawn on the surface of the hologram).

When the angle measured on the laser oscillator 12 side relative to the normal (not shown) is represented by plus and the angle measured on the opposite side is represented by minus, the angles of incidence of the above reference beam 6 and the object beam 8 are plus and minus, respectively. Here, when the sign of the angle of incidence of the reference beam and the angle of incidence of the object beam are different from each other, if the absolute values of the angles are different, light reflected on the surface on the vehicle inner side of the wind-proof glass and the reflected light of the display image to be visually recognized, do not overlie one on another. Further, the smaller the angle formed by the reference beam and the object beam, the wider the diffraction wavelength width of the obtained hologram, and such is preferred in view of application to color display. However, reduction of the angle formed by the reference beam and the object beam is limited, since the above optical components overlie one on another so long as the optical components are used and recording is made by means of two incident lights.

Figure 3:
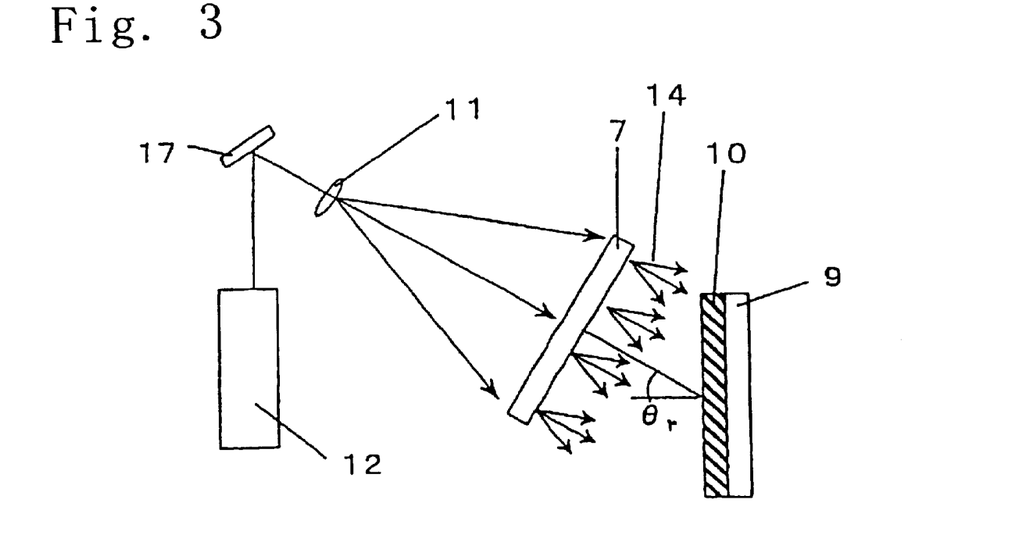
FIG. 3 is a conceptual plan view illustrating another example of a method for producing a diffusion type hologram which is used in a first embodiment of the present invention.

FIG. 3 is a conceptual plan view illustrating another example of a method for producing a transmission diffusion hologram which is used in a first embodiment of the present invention. Diffused light 14 transmitted through a diffusion optical component 7 such as a frosted glass alone is made to fall on one side of a hologram photosensitive material 10 attached to a substrate glass 9, and the resulting interference fringes of diffused lights are recorded. Other numerical references which are the same as in FIG. 2 indicate the same constituents as used in FIG. 2. Here, the angle of incidence $\theta_r$ of diffused light 14 is calculated on the basis of the angle of incidence from the light source to the transmission diffusion hologram and the angle of emission from the transmission diffusion hologram to the observer in FIG. 1.

In the hologram recorded by a method as illustrated in FIG. 3, the laser beam to be used is object beam alone, and there is no difference in the angle of incidence between the reference beam and the object beam as in FIG. 2, and accordingly the diffraction wavelength width becomes wide as compared with the case of FIG. 2 regardless of the angle of incidence of the object beam during recording, and a device capable of color displaying with any layout of an optical component can be obtained. Further, since only object beam is used, the power of the laser beam as the object beam is intense, the laser beam is substantially insusceptible of disturbance such as disturbance of the air during recording, and a hologram excellent in diffraction characteristics can be obtained in a short period of time. This improves productivity also.

Accordingly, it is extremely preferred to use a transmission type hologram which is produced by disposing a diffusion optical component having diffusion properties on one side of a hologram photosensitive material, and which is recorded by diffused light transmitted through the diffusion optical component alone. Further, a transmission diffusion hologram produced by utilizing diffused light reflected on a diffusion optical component having diffusion properties may also be used.

As the above hologram photosensitive material, various photosensitive materials such as an acrylic or polyvinyl carbazole type photopolymer, dichromated gelatin, photoresist and silver salt may be used, and most preferred is a dry-process photopolymer in view of mass production, which requires no wet treatment after irradiation with laser beam. As the dry-process photopolymer, an acrylic one is particularly preferred. Further, as the hologram, a volume phase hologram is preferred since a high diffraction efficiency can be obtained, and e.g. holograms called embossed type and rainbow type can also be widely used. Further, the hologram photosensitive material is preferably as thin as possible so as to prevent decrease in transmission due to absorption of the hologram photosensitive material itself.

Further, as the above diffused light, light reflected on a surface of aluminum having a satin treatment applied thereto can be used, in addition to light transmitted through e.g. a frosted glass.

Here, color of hologram reflection and complementary color thereof, external light noise and the like are reduced when the above transmission diffusion hologram is used, however, in a common transmission diffusion hologram, the visible light transmittance ($T_v$) may be low in some cases, since the diffraction wavelength width is wide. Further, in a case where external light such as a rear light of a car ahead of the vehicle or a headlight of a car coming from the opposite direction is present, said light is diffracted by the hologram, and spread of light around the light source appears (hereinafter this phenomenon will be referred to as halation), and it tends to be difficult to see the display information in some cases.

Figure 4:
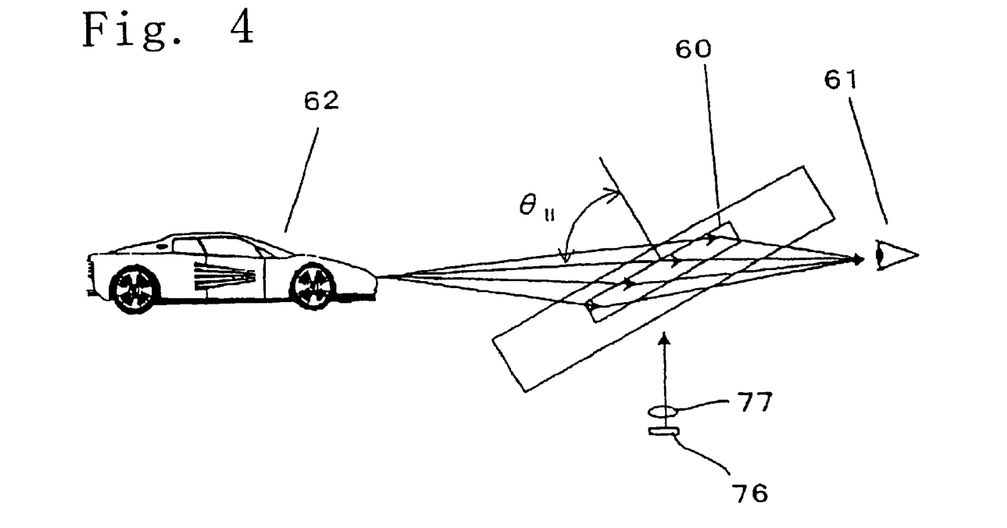
FIG. 4 is a conceptual view illustrating generation of halation on a wind-proof glass of a vehicle.

A conceptual view illustrating generation of this halation in a wind-proof glass of a vehicle is shown in FIG. 4. FIG. 4 illustrates a case where an external light such as a headlight of a car 62 coming from the opposite direction or a rear light of a car ahead of the vehicle is present on the side opposite to an observer 61 via a transmission diffusion hologram 60, on a line connecting the observer 61 and the transmission diffusion hologram 60. In such a case, the external light is diffracted by the transmission diffusion hologram 60, and spread of light (halation) around the light source (external light) appears to the observer 61. Here, numerical references 76 and 77 represent a display element and an imaging optical component, respectively.

Accordingly, as a second embodiment, a constitution example of a holographic display device, which can prevent halation due to such an external light, and with which visible light transmittance can be improved without decreasing diffraction efficiency in a transmission diffusion hologram, will be shown below.

A holographic display device according to this embodiment has a transmission diffusion hologram which is produced by disposing a diffusion optical component having a small angle of diffraction of light on one side of a hologram photosensitive material, and which is recorded by diffused light transmitted through or reflected on the above diffusion optical component alone.

Figure 5:
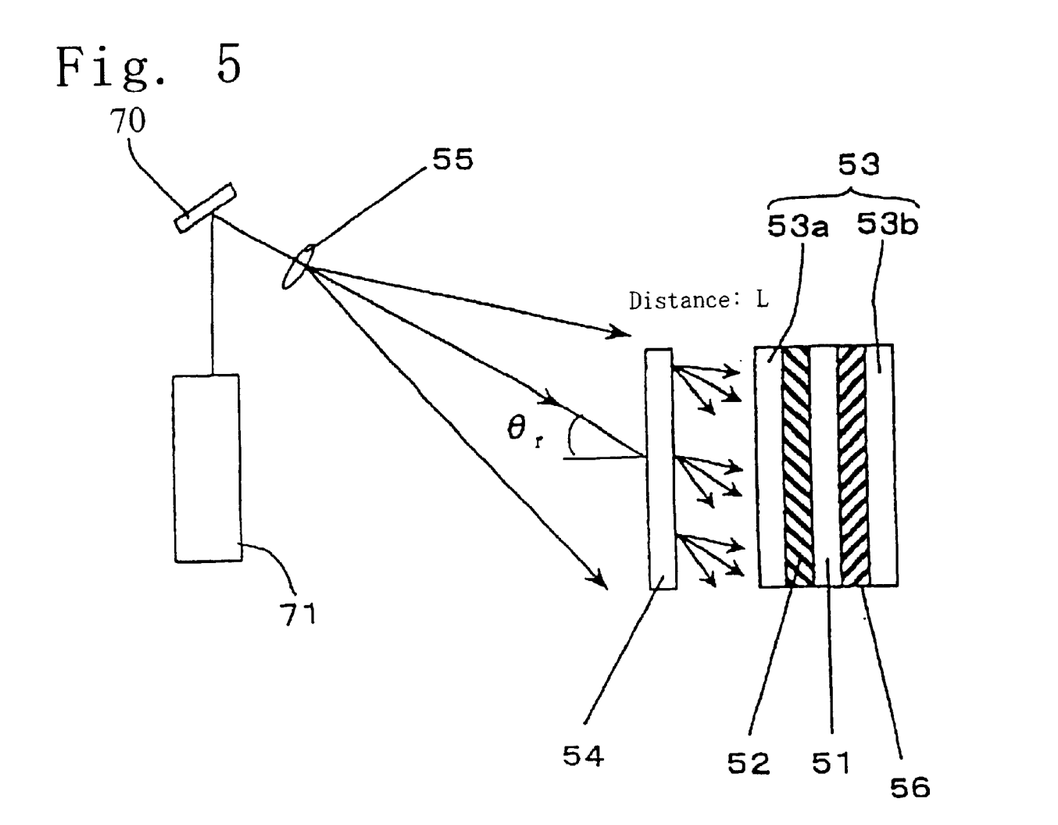
FIG. 5 is a conceptual view illustrating one example of a method for producing a transmission diffusion hologram which is used in a second embodiment of the present invention.

FIG. 5 is a conceptual view illustrating one example of a method for producing a transmission diffusion hologram which is used in the second embodiment of the present invention.

As illustrated in FIG. 5, a hologram photosensitive material 52 attached to a substrate glass 51 is sandwiched between non-reflection coating (AR coating) glasses 53 (53a, 53b) by means of a refractive index matching liquid, and in the very vicinity of the non-reflection coating glass 53a on one side (incident side) of the hologram photosensitive material 52 (at a distance L from the hologram photosensitive material 52), a diffusion optical component 54 having light diffusion properties is disposed in parallel with the above hologram photosensitive material 52, and laser beam from a laser apparatus 71 expanded by a spatial filter 55 is irradiated from the same side as the diffusion optical component 54 at an angle of incidence of $\theta_r$ for recording. Accordingly, a transmission diffusion hologram which transmits incident light while diffracting it at a predetermined angle, can be formed. Here, numerical reference 57 indicates a mirror.

Figure 6:
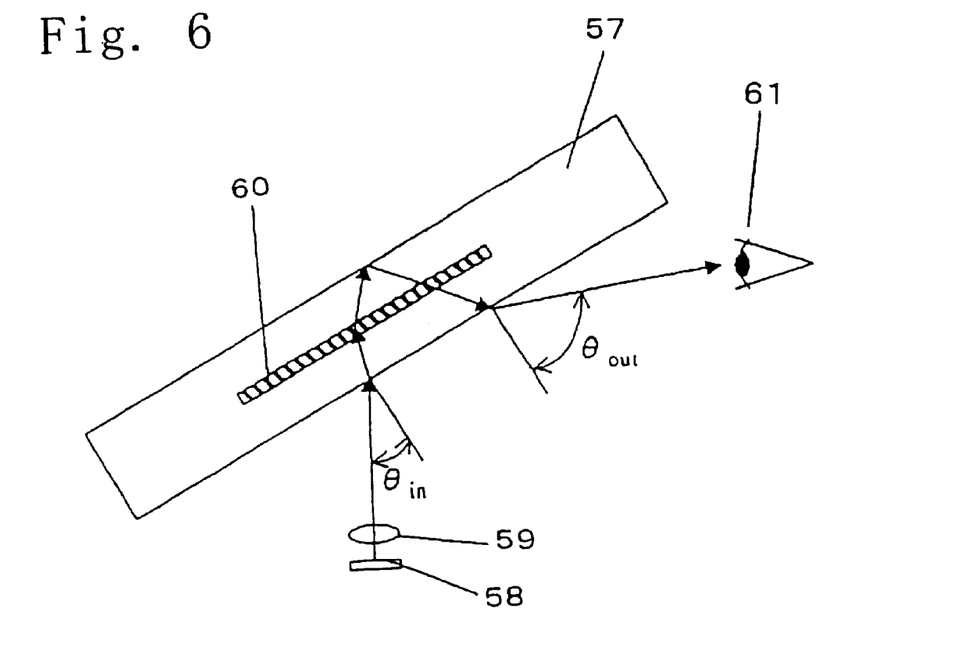
FIG. 6 is a cross-sectional view illustrating one example of a holographic display device employing a transmission diffusion hologram according to a second embodiment.

Here, the angle of incidence $\theta_r$ of the laser beam is determined in accordance with the following formula (1) from the angle of incidence $\theta_{in}$ of light incident from a display element 58 to a transmission diffusion hologram 60 and the angle of emission $\theta_{out}$ of light emitted from the transmission diffusion hologram 60 to an observer 61, as illustrated in FIG. 6 as mentioned hereinafter. Here, in the formula (1), the index I indicates an internal angle.

$$\theta_{rI}=(\theta_{in}I+\theta_{out}I)/2 \quad (1)$$

Further, a deep color glass 56 is provided in order to reduce reflection noise at the interface between the deep color glass 56 and the non-reflection coating glass 53b and at the interface between the non-reflection coating glass 53b and the air. By interposing the deep color glass 56 on the side opposite to the incident light of the hologram photosensitive material 52, irradiated laser beam is transmitted through the hologram photosensitive material 52 and then absorbed into the deep color glass 56, whereby noise due to reflected light on the non-reflection coating glass 53b on the side opposite to the incident light can be reduced.

Namely, in a case of a deep color glass having a visible light transmittance of t%, the amount of light which is transmitted through the hologram photosensitive material 52 and reflected on the surface (reflectance r%) on the side opposite to the incidence side of the non-reflection coating glass 53b, and which reaches the hologram photosensitive material 52 again is $(t/100)\times(r/100)\times(t/100)=rt^2/(100)^3$. For example, in a case where the visible light transmittance of the above deep color glass 56 is 14% and the reflectance of the non-reflection coating glass 53b is 0.5%, $0.5 \times 14^2/(100)^3=98/1000000\%$ of the irradiated laser beam, i.e. reflected light of only about 0.01% falls on the hologram photosensitive material 52 again as noise, and the noise light can be significantly reduced.

Further, it is preferred to use p-polarized laser beam (perpendicular to the paper plane in FIG. 5) as laser beam for recording, whereby the noise can further be reduced.

Here, the above deep color glass 56 is provided in order to absorb noise of the reflected laser beam from the non-reflection coating glass 53 during formation of the hologram, and is removed after formation of the hologram.

FIG. 6 is a cross-sectional view illustrating one example of a holographic display device employing a transmission diffusion hologram according to a second embodiment, as described above.

The holographic display device comprises a light-emitting display means consisting of a display element 58 having a light source which emits information to be displayed as light and an imaging optical component 59 such as a lens. The display element 58 and the imaging optical component 59 are disposed, for example, in a dashboard located at the lower portion of a wind-proof glass 57 of a vehicle.

The imaging optical component 59 is disposed between the display element 58 and the wind-proof glass 57, and is to form a display image of light emitted from the display element 58 on a transmission diffusion hologram 60 provided to the wind-proof glass 57. The image of light emitted from the display element 58 and incident to the wind-proof glass 57 at an angle of incidence $\theta_{in}$, formed on the transmission diffusion hologram 60, is diffracted when transmitted through the transmission diffusion hologram 60 and its direction of movement is changed, and the image is reflected on the interface with the air on the vehicle outer side of the wind-proof glass 57. Then, the above display image falls on the transmission diffusion hologram 60 again and is transmitted therethrough as it is, is emitted from the wind-proof glass 57 at an angle of emission $\theta_{out}$, and is visually recognized by an observer 61.

By such a constitution, a transmission diffusion hologram with which a real image of a display image from the display element 58 and the imaging optical component 59 can be visually recognized by the observer 61, can be realized. With the holographic display device mounted with the transmission diffusion hologram of the present embodiment, by optionally selecting the diffusion optical component, halation due to external light such as solar light can be reduced, and the visible light transmittance can be increased. A detailed explanation will be made hereinafter with this regard.

The information to be displayed in the present embodiment is optionally selected according to the display application. It may, for example, be instruments and display lamps to be provided in a vehicle, and a speedmeter, a tachometer and various alarm lamps, navigation information and night driving supporting image may be mentioned as examples. The observer is mainly a driver of a vehicle, but includes passengers in the passenger seats.

As one which is provided with the holographic display device of the present invention, automobiles may be mentioned, in which driving information has to be visually recognized without moving the line of sight, and in addition, railway vehicles, shipping and aircrafts may, for example, be mentioned. Further, the holographic display device can be applied to another display device such as a glass of a show window, in addition to driving-related information. The information to be displayed in the case of such display devices is optionally selected depending upon the display application.

In any display device, it is more preferred to apply AR coating to the surface on the observer side of a hologram combiner in order to improve utilization efficiency of light containing information from a display light source. Further, display brightness can be improved by applying a high reflection coating (HR coating) to the surface on the side opposite to the observer of a hologram combiner, so as to satisfy the visible light transmittance of at least 70% for automobiles with such a condition, or regardless of such a condition for the other display devices.

As the above AR coating, coating with $MgF_2$ by vacuum deposition or multiple coating with a dielectric material may be employed. Further, as the above HR coating, coating with a metal membrane of e.g. Cr by vacuum deposition or multiple coating with a non-metallic dielectric material may be employed.

Figure 7:
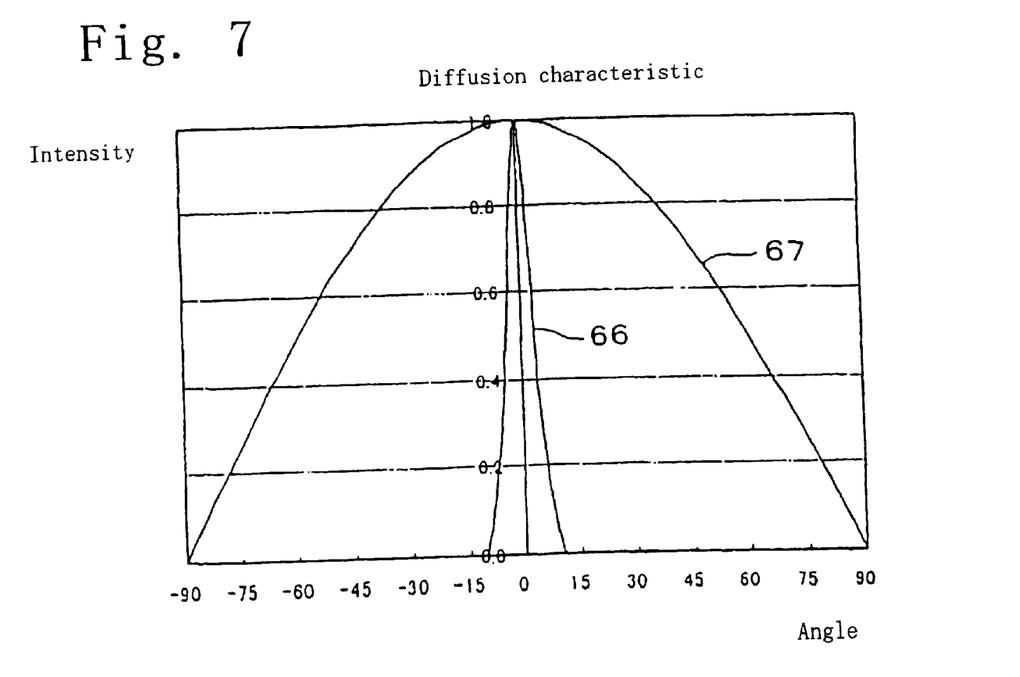
FIG. 7 is a diffusion characteristic graph illustrating angle distribution of intensity of diffused light of a diffusion optical component.

FIG. 7 is a diffusion characteristic graph illustrating angle distribution of intensity of diffused light on a diffusion optical component.

In recent years, window-glasses of vehicles tend to be colored (the transmittance tends to be low), but the visible light transmittance ($T_v$) at a wavelength range of from 380 to 780 is set to be at least 70% with respect to wind-proof glasses for automobiles, and further transparency of a hologram is required. In order to increase the visible light transmittance ($T_v$) of the hologram, decrease in the diffraction efficiency is the simplest way, but if the diffraction efficiency is decreased, decrease in display brightness is caused, and no display device with good visual recognizability can be obtained.

In FIG. 7, the numerical reference 66 indicates a diffusion characteristic example of a diffusion optical component with a small diffusion angle used for production of the transmission diffusion hologram according to the present embodiment, and the numerical reference 67 indicates a diffusion characteristic example of a conventionally used diffusion optical component with a large diffusion angle.

The smaller the diffusion angle of the diffusion optical component, the more uniform the lattice-face spacing of the diffraction gratings to be recorded in the inside of the hologram tends to be in general, and light diffracted to various directions tends to decrease and the amount of diffracted light for a desired direction tends to increase. As a result, between holograms having the same diffraction efficiencies, one recorded with a diffusion optical component having a small diffusion angle has a brighter display image by the hologram.

Further, the larger (upper limit 90°) the angle of incidence $\theta_r$ of recording light, the larger the slanting angle of the diffraction gratings in the inside of the hologram, and visible light beam incident to the hologram at right angles undergoes substantially no diffraction. Accordingly, when the angle of incidence $\theta_r$ of recording light is made large, substantially no visible light transmittance will be impaired.

On the other hand, with respect to a conventional hologram recorded by a diffusion optical component having a large diffusion angle, diffraction gratings have various slanting angles, and a part of visible light incident to the hologram at right angles is diffracted even if the angle of incidence $\theta_r$ of recording light is large, and as a result, the visible light transmittance decreases.

As the diffusion optical component having a small diffusion angle, a frosted glass with rough frosting or a shaped-beam diffuser may, for example, be used.

FIGS. 8(A), 8(B), 8(C) and 8(D) are action explanatory diagrams illustrating results of simulation how halation spreads.

In order to reduce the halation, it is necessary to optimize the above diffusion angle and the distance L between the diffusion optical component 54 and the hologram photosensitive material 52 as illustrated in FIG. 5.

FIGS. 8(A), 8(B), 8(C) and 8(D) are diagrams illustrating halation characteristics to various holograms recorded and produced with different diffusion angles and the distances L when the size of the hologram photosensitive material 52 is 100 mm×100 mm, the size of the diffusion optical component 54 is 150 mm×150 mm, and the angle of incidence $\theta_r$ of recording light is 45°, in the hologram production system as illustrated in FIG. 5. Here, results of calculation how halation spreads at a distance of 800 mm from the hologram surface are shown in a case where light is made to fall on the hologram under each condition, at an angle of incidence of $\theta_{II}=60°$ (i.e. corresponding to slanting angle of the windproof glass of 30°) from a distance of 900 mm on the side opposite to the recording light for generation of halation. Here, the size of dots in Figs. indicates a relative diffraction light intensity.

Figure 8A:
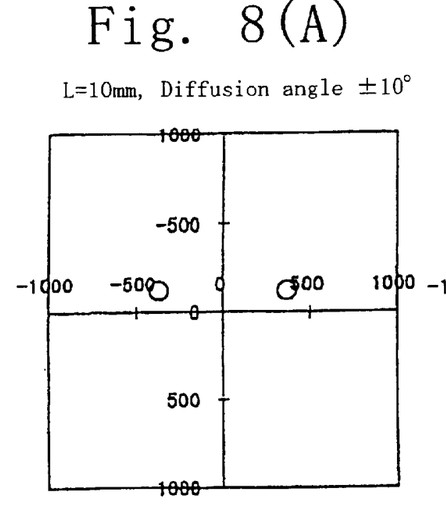
FIGS. 8(A), 8(B), 8(C) and 8(D) are action explanatory diagrams illustrating results of simulation how halation spreads to various holograms recorded and produced with different diffusion angles and distances between a diffusion optical component and a hologram photosensitive material.
Figure 8B:
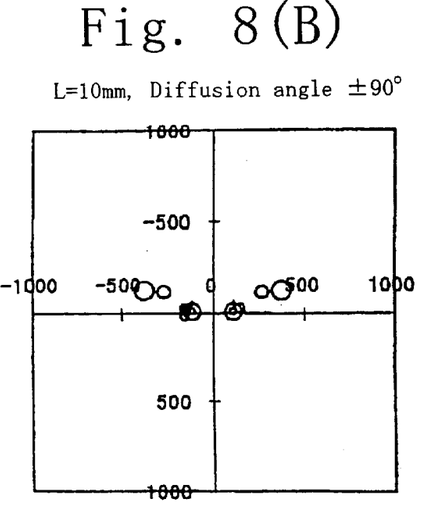
Figure 8C:
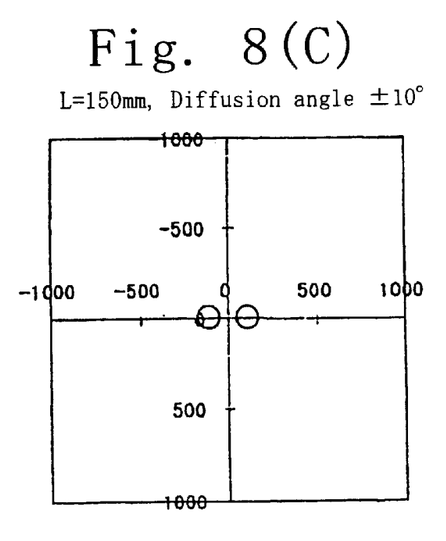
Figure 8D:
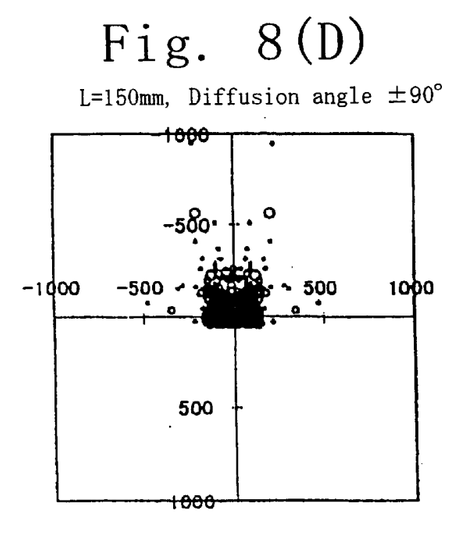

FIG. 8(A) illustrates a case where the distance L is 10 mm and the diffusion angle is ±10°. FIG. 8(B) illustrates a case where the distance L is 10 mm and the diffusion angle is ±90°. FIG. 8(C) illustrates a case where the distance L is 150 mm and the diffusion angle is ±10°. FIG. 8(D) illustrates a case where the distance L is 150 mm and the diffusion angle is ±90°, and corresponds to a hologram produced by a conventional method.

As evident from FIGS. 8(A) to 8(D), the halation in the vicinity of the center portion tends to be little when the distance L between the diffusion optical component 54 and the hologram photosensitive material 52 is small, and the diffusion angle of the diffusion optical component 54 is small. Namely, in a case where the holographic display device is used as a display device for a vehicle as illustrated in FIG. 6, since the distance between the transmission diffusion hologram 60 and the observer 61 is from 700 to 1,000 mm, the halation can be reduced at the point of view of the observer by making the distance L between the diffusion optical component 54 and the hologram photosensitive material 52 small and by making the diffusion angle of the diffusion optical component 54 small.

As explained above, when the diffusion angle of the diffusion optical component 54 is small, the halation can be reduced, and a transmission diffusion hologram having a high visible light transmittance can be obtained. Further, decrease of the distance L between the diffusion optical component 54 and the hologram photosensitive material 52 is effective for further reduction in halation.

Now, the present invention will be described in detail with reference to Examples. However, it should be understood that the present invention is by no means restricted to such specific Examples.

EXAMPLE 1

This Example 1 corresponds to the first embodiment.

A hologram photo sensitive material used was "OmniDex 706M", trade name, manufactured by Du Pont (thickness 20 µm), and this was attached to a glass substrate.

Employing the optical setup as illustrated in FIG. 2, a transmission diffusion hologram was produced under the following conditions.

Laser wavelength used: 545 nm (dye laser)

Reference beam: at an angle of 70° to a normal of the hologram photosensitive material; spherical wave which diverges at a distance of 600 mm from the center portion of the hologram photosensitive material object beam: at an angle of −50° to a normal of the hologram photosensitive material; light transmitted and scattered through a frosted glass Intensity ratio of the reference beam to the object beam: 1:1

Exposure amount: 100 mJ/cm² (exposure intensity: 1mW/cm², exposure time: 100 sec.)

The obtained hologram was irradiated with ultraviolet rays of 100 mJ/cm², followed by heat treatment at 120° C. for 2 hours to obtain a transmission diffusion hologram. The hologram thus obtained was enclosed in a wind-proof glass 1 made of a laminated glass as illustrated in FIG. 1, and a display element 2 was disposed at a distance of about 600 mm from the wind-proof glass 1. The display element 2 used here was a liquid crystal display element provided with a liquid crystal display panel.

An imaging optical component 3 consisting of a convex lens having a focal length of about 90 mm was disposed at a distance of about 100 mm from the display element 2. Here, the slanting angle of the wind-proof glass 1 was about 26° to the horizontal direction, the angle of incidence of display light from the display element 2 to the hologram was 79°, and the angle of emission of display light from the hologram to an observer was −50° (each being angle formed with a normal drawn at the incidence point of the display light on the wind-proof glass 1).

Here, since the angle of incidence of the display light to the hologram surface was so great as 79, the imaging positions in the hologram surface were different. Accordingly, the liquid crystal panel surface in the display element 2 was inclined by about 50° in order for uniform imaging in the transmission diffusion hologram surface. Hereinafter this will be referred to as imaging position correction. Here, the magnification was about 5 times. A driver as an observer could read formed display image clearly.

Further, since a transmission diffusion hologram was used for a portion on the wind-proof glass to which light containing information was projected, no color of reflection toward the outside of the vehicle nor complementary color toward the inside of the vehicle was observed, which would be generated with a reflection diffusion hologram, such being favorable in view of design and safety. Further, no external light noise was measured.

EXAMPLE 2

The following Examples 2 to 4 and 6 correspond to the second embodiment.

As a hologram photosensitive material 52, HRF750X305-10 (thickness 10 µm) which was of acrylic, manufactured by Du Pont, was used, and this hologram photosensitive material 52 was attached to a substrate glass 51 to obtain a hologram recording dry plate (FIG. 5).

Further, as a deep color glass 56, one having a thickness of 5 mm and a visible light transmittance of 14% was used.

In FIG. 5, the distance L between the hologram photosensitive material 52 and a diffusion optical component 54 was made 10 mm, and a shaped-beam diffuser (trade name: LSD10PC-10) manufactured by POC, U.S., the diffusion angle of which was ±10° (the diffusion characteristic corresponds to the curve as indicated by the numerical reference 66 in FIG. 7), was used as a diffusion optical component 54, and exposure was carried out under the following condition 1 as exposure conditions (laser wavelength, recording light and exposure amount) to produce a transmission diffusion hologram. These conditions correspond to conditions under which the halation characteristic of FIG. 8(A) can be obtained, and they are the best conditions among FIGS. 8(A) to 8(D) in view of halation.

Conditions 1

Laser wavelength: 515 nm (Ar⁺ laser apparatus)

Recording light: $\theta_r$=45° to a normal on the hologram recording dry plate; spherical wave which diverges at a distance of 1500 mm from the center portion of the hologram recording dry plate Exposure amount: 100 mJ/cm² (exposure intensity: 1 mW/cm², exposure time 100 sec.)

The hologram produced by exposure under the above conditions 1 was irradiated with ultraviolet rays of 1,000 mJ/cm², followed by heat treatment at 120° C. for 2 hours to obtain a transmission diffusion hologram 60.

The transmission diffusion hologram 60 thus produced was enclosed in a wind-proof glass 57 (laminated glass of a clear glass with a thickness of 2 mm and a bronze glass with a thickness of 2 mm), and halation was observed under the following condition 2 of the slanting angle of the wind-proof glass 57, the angle of incidence from a display element 58 to the transmission diffusion hologram 60 and the angle of emission from the transmission diffusion hologram 60 to an observer 61, when the distance between the display element 58 and the wind-proof glass 57 was made about 600 mm and the distance between the display element 58 and an imaging optical component 59 consisting of a convex lens having a focal length of about 90 mm was made about 100 mm.

Conditions 2

Slanting angle of the wind-proof glass 57: about 30° (angle formed with a horizontal line which is not shown in FIG. 6)

Angle of incidence from the display element 58 to the transmission diffusion hologram 60: about 30°

Angle of emission from the transmission diffusion hologram 60 to the observer 61: about 65°

Here, the angle of incidence of light of the display image to the transmission diffusion hologram 60 was not vertical, the imaging positions in the plane of the transmission diffusion hologram 60 were different. Accordingly, the liquid crystal panel surface in the display element was inclined by about 5° for imaging position correction. Here, the magnification was about 5 times, and a driver as the observer 61 could read formed display image clearly.

Figure 9:
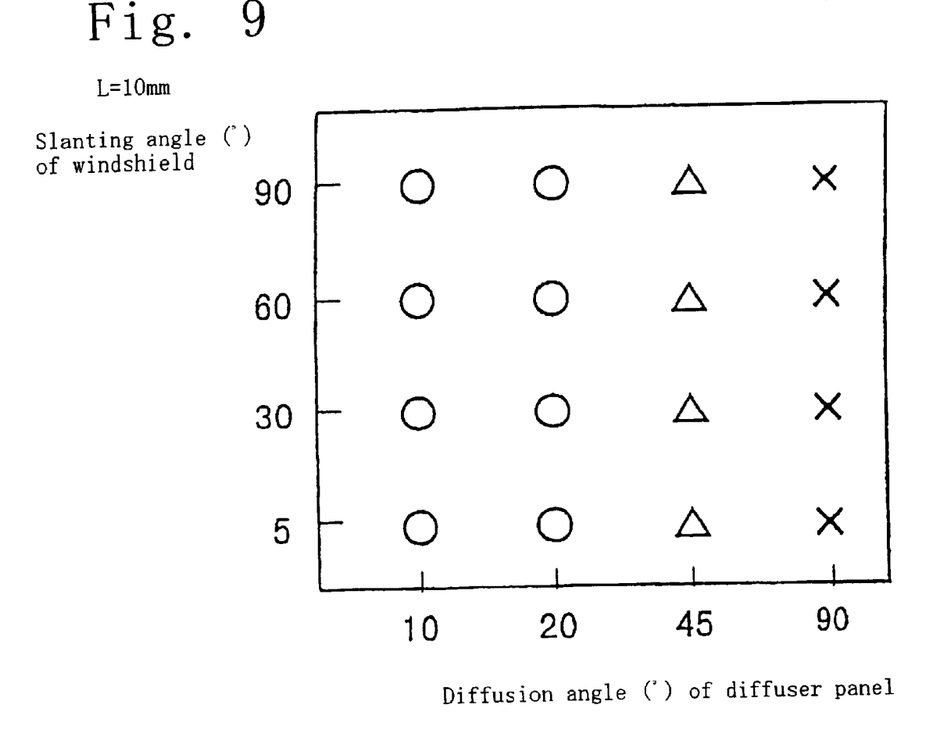
FIG. 9 is a diagram illustrating characteristics between slanting angle of a wind-proof glass and lo diffusion angle of a diffuser panel when L=10 mm.

Further, the distance between the transmission diffusion hologram 60 and an external light source corresponding to e.g. a headlight of a car coming from the opposite direction was made to be at least 900 mm, and halation was observed with a distance between the wind-proof glass 57 and the observer 61 within a range of from 700 mm to 1,000 mm, but no halation was visually recognized by the observer 61 at a slanting angle of the wind-proof glass 57 of from 5° to 90° (see FIG. 9).

Here, FIG. 9 is a diagram illustrating results of simulation with regard to presence or absence of halation in holograms produced by changing the diffusion angle and the slanting angle of the wind-proof glass when the distance L between the diffusion optical component and the hologram photosensitive material was 10 mm. Here, the simulation was carried out with values of diffusion angle of plus or minus, but absolute values are shown in FIG. 9. In the graph, ○ indicates no halation observed, Δ indicates no halation observed within a range of ±1,000 mm at the right and left and above and below at a distance of 800 mm from the hologram, and X indicates halation observed within a range of ±1,000 mm.

EXAMPLE 3

Using as a diffraction optical component 54 one having a diffusion characteristic with a diffusion angle of ±20° and changing the distance L between a hologram photosensitive material 52 and a diffusion optical component 54 by every 10 mm within a range of L=10 mm to 150 mm, exposure was carried out under the exposure conditions of the above conditions 1, and irradiation with ultraviolet rays of 1,000 mJ/cm$^2$ was carried out, followed by heat treatment at 120° C. for 2 hours to produce a transmission diffusion hologram 60.

The produced transmission diffusion hologram 60 was enclosed in a wind-proof glass 57 (laminated glass of a clear glass with a thickness of 2 mm and a bronze glass with a thickness of 2 mm) and disposed as illustrated in FIG. 6, and the above imaging position correction was further carried out under the above condition 2 for observation, whereby an observer 61 could read formed display image clearly.

Figure 10:
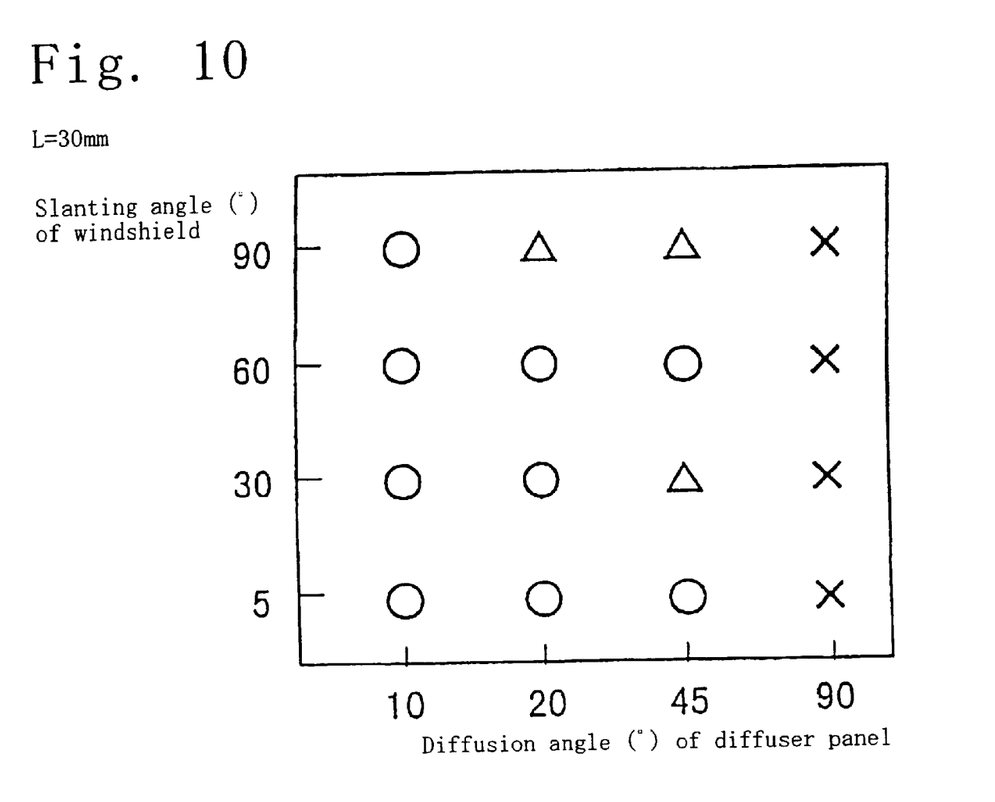
FIG. 10 is a diagram illustrating characteristics between slanting angle of a wind-proof glass and diffusion angle of a diffuser panel when L=30 mm.

Here, the distance between the transmission diffusion hologram 60 and the external light source corresponding to e.g. a headlight of a car coming from the opposite direction was made at least 900 mm, and halation was observed with a distance between the wind-proof glass 57 and the observer 61 within a range of from 700 mm to 1,000 mm, but no halation was visually recognized by the observer 61 at a slanting angle of the wind-proof glass 57 of from 30° to 60° in each transmission diffusion hologram 60 produced by changing the above distance L by every 10 mm within a range of L=10 mm to 40 mm (see FIGS. 9, 10 and 11), and further, in a case of using the transmission diffusion hologram 60 produced under a condition of the above distance L within 30 mm, no halation was observed by the observer 61 even at a wide range of slanting angle of the wind-proof glass 57 of from 5° to 60° (see FIGS. 9 and 10).

Figure 11:
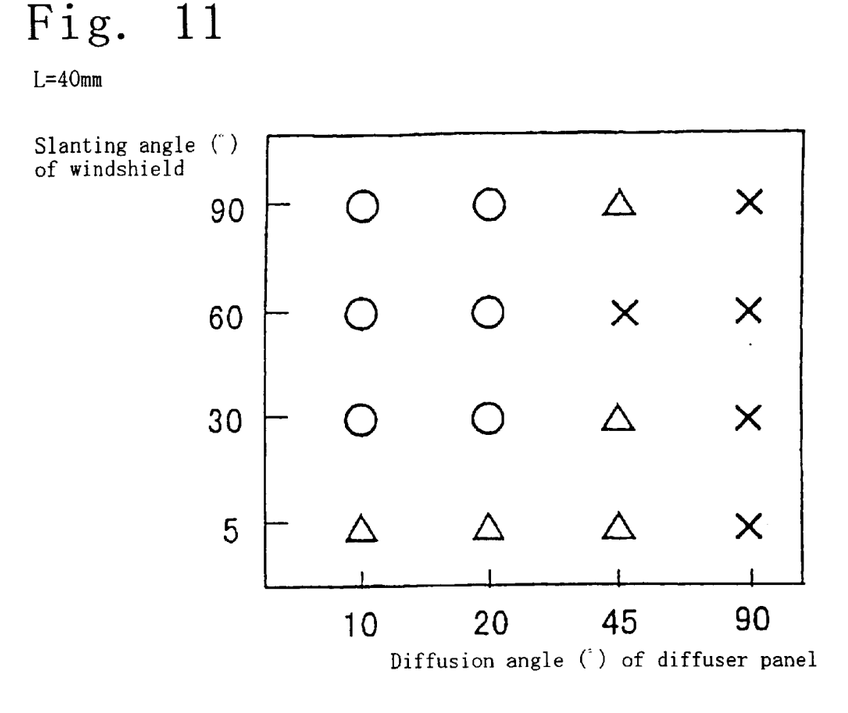
FIG. 11 is a diagram illustrating characteristics between slanting angle of a wind-proof glass and diffusion angle of a diffuser panel when L=40 mm.

Here, FIGS. 10 and 11 are graphs illustrating results of simulation with regard to presence or absence of halation in holograms prepared by changing the diffusion angle and the slanting angle of the wind-proof glass when the distances L between the diffusion optical component and the hologram photosensitive material were 30 mm and 40 mm, respectively. In the graphs, ○, Δ and X indicate the same meanings as in FIG. 9.

EXAMPLE 4

The distance L between the hologram photosensitive material 52 and a diffusion optical component 54 was made 30 mm, and the same shaped-beam diffuser as in Example 2 (trade name: LSD10PC-10) manufactured by POC, U.S., the diffusion angle of which was ±10° (the diffusion characteristic corresponds to the curve as indicated by the numerical reference 66 in FIG. 7) was used as a diffusion optical component 54, and exposure was carried out under the above condition 1 as exposure conditions (laser wavelength, recording light and exposure amount) to produce a transmission diffusion hologram.

This transmission diffusion hologram was irradiated with ultraviolet rays of 1,000 mJ/cm$^2$, followed by heat treatment at 120° C. for 2 hours to obtain a transmission diffusion hologram 60.

Figure 12:
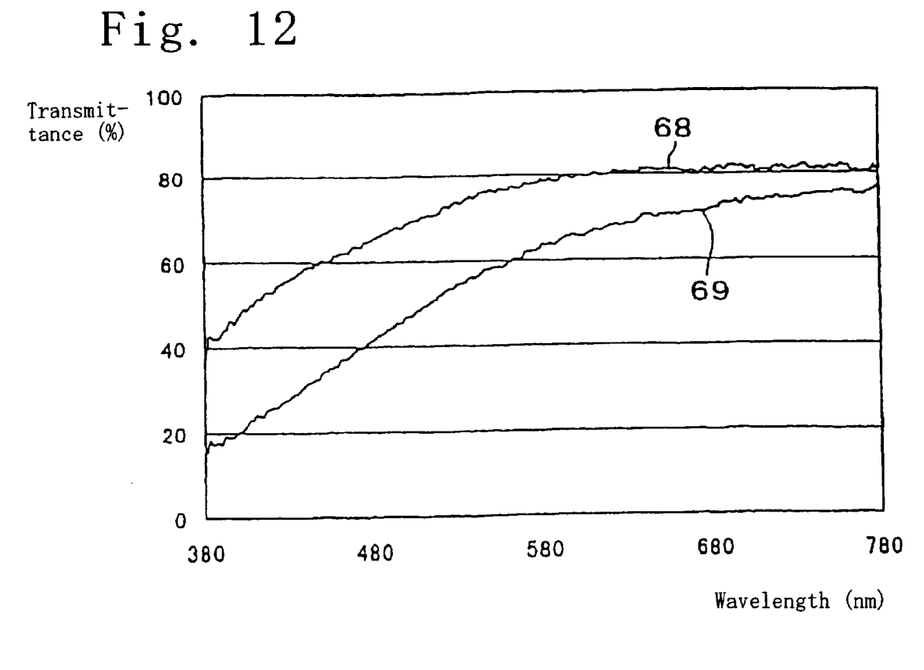
FIG. 12 is a characteristic view illustrating a vertical transmittance relative to a wavelength of visible light in a state where a transmission diffusion hologram is enclosed in a wind-proof glass of a vehicle.

This transmission diffusion hologram 60 was enclosed in a wind-proof glass for an automobile (laminated glass of a clear glass with a thickness of 2 mm and a bronze glass with a thickness of 2 mm), and the vertical transmittance was measured in such a state. FIG. 12 is a characteristic diagram illustrating a vertical transmittance to a wavelength of visible light, and the curve indicated by the numerical reference 68 corresponds to this Example. Here, the visible light transmittance ($T_v$) within a wavelength range of from 380 to 780 nm was about 76.9% as a result of calculation. In such a case, the automobile safety standard was adequately satisfied.

Then, the diffusion optical component 54 was changed to one having a diffusion characteristic with a diffusion angle of ±20° while the distance L between the hologram photosensitive material 52 and the diffusion optical component 54 was kept to be 30 mm, exposure was carried out under exposure conditions of the above conditions 1 , and irradiation with ultraviolet rays of 1,000 mJ/cm$^2$ was carried out, followed by heat treatment at 120° C. for 2 hours to produce a transmission diffusion hologram 60, which was then enclosed in a wind-proof glass (laminated glass of a clear glass with a thickness of 2 mm and a bronze glass with a thickness of 2 mm), whereby the visible light transmittance ($T_v$) within a wavelength range of from 380 to 780 nm was 72.6%.

EXAMPLE 5

On the other hand, of a hologram recorded by a diffusion optical component with a large diffusion angle, the diffraction gratings variously incline, and even when the angle of incidence $\theta_r$ of the recording light is large, a part of visible light incident at right angles to the hologram is diffracted, and the visible light transmittance decreases as a result.

For comparison, a transmission diffusion hologram produced by using a #600 double-side frosted glass (diffusion characteristic thereof corresponds to the curve indicated by the reference numeral 67 in FIG. 7) having a large diffusion angle which has been conventionally used as the diffusion optical component 54, was enclosed in a wind-proof glass for automobiles (laminated glass of a clear glass with a thickness of 2 mm and a bronze glass with a thickness of 2 mm), and the vertical transmittance was measured in such a state. The curve indicated by the reference numeral 69 in FIG. 12 corresponds to this Comparative Example. Here, the visible light transmittance ($T_v$) within a wavelength range of from 380 nm to 780 nm was 60.5%, and the automobile safety standard was not satisfied.

Here, in the above Example 4, the distance L between the diffusion optical component 54 and the hologram photosensitive material 52 was made 30 mm, but it does not have to be limited to 30 mm, and it is suitably within a range of from 0 to 200 mm in a case where the visible light transmittance alone is taken into consideration. However, more preferably it is small when generation of halation is taken into consideration, which can be understood from FIGS. 9, 10 and 11.

As explained in the above Examples 2 to 4, the visible light transmittance ($T_v$) at a wavelength range of from 380 to 780 nm is at least about 70% as measured in such a state that the transmission diffusion hologram 60 produced by using as a diffusion optical component 54 a diffusion optical component with a diffusion angle of ±10° or ±20° is enclosed in a wind-proof glass for automobiles (laminated glass of a clear glass with a thickness of 2 mm and a bronze glass with a thickness of 2 mm), and the automobile safety standard is adequately satisfied.

Further, the space (the above distance L) between the diffusion optical component 54 and the hologram photosensitive material 52 is preferably as small as possible in order to decrease the halation. In a case where a diffusion optical component with a diffusion angle of ±20° is used, when a hologram is prepared with a distance L of 30 mm, no halation may be observed within a range of ±1,000 mm at the right and left and above and below at a distance of 800 mm from the hologram even at a wide range of slanting angle of the wind-proof glass 57 of from 5° to 90°. Further, in such a case, the visible light transmittance ($T_v$) within a wavelength range of from 380 nm to 780 nm satisfies automobile safety standard.

Further, when the produced transmission diffusion hologram 10 was disposed as illustrate in FIG. 6, the distance between the display element 58 and the wind-proof glass 57 is made about 300 mm and the distance between the element 58 and an imaging optical component 59 consisting of a convex lens having a focal length of about 60 mm is made about 50 mm, and the above imaging position correction is carried out to observe the display image under the above condition 2, the magnification of the display image is about 5 times, and a driver as an observer can read the formed display image clearly.

As mentioned above, when the transmission diffusion hologram of the present embodiment is used for a wind-proof glass of a vehicle as a holographic display device, no color of reflection toward the outside of the vehicle nor complementary color toward the inside of the vehicle at a hologram installation position of the wind-proof glass will be observed, and a holographic display device which is preferred in view of design and visible recognizability can be realized.

Further, halation generated due to a rear light of a car ahead of the vehicle or a headlight of a car coming from the opposite direction can be reduced or eliminated, and a holographic display device which is more preferred in view of safety can be realized.

Further, a display device with a high visible light transmittance and a good visual recognizability can be realized without decreasing the diffraction efficiency.

EXAMPLE 6

In FIG. 5, the distance L between the hologram photosensitive material 52 and the diffusion optical component 54 was made 10 mm, and a shaped-beam diffuser (trade name: LSD10PC-10) manufactured by POC, U.S., the diffusion angle of which was ±10° (the diffusion characteristic corresponds to the curve as indicated by the numerical reference 66 in FIG. 7) was used as the diffusion optical component 54, and exposure was carried out under the following condition 3 as exposure conditions (laser wavelength, recording light and exposure amount) to produce a transmission diffusion hologram.

Conditions 3

Laser wavelength: 515 nm ($Ar^+$ laser apparatus)

Recording light: $\theta_r$=21.4° to a normal on the hologram recording dry plate; spherical wave which diverges at a distance of 1,500 mm from the center portion of the hologram recording dry plate     Exposure amount: 100 $mJ/cm^2$ (exposure intensity: 1 $mW/cm^2$, exposure time 100 sec.)

Figure 13:
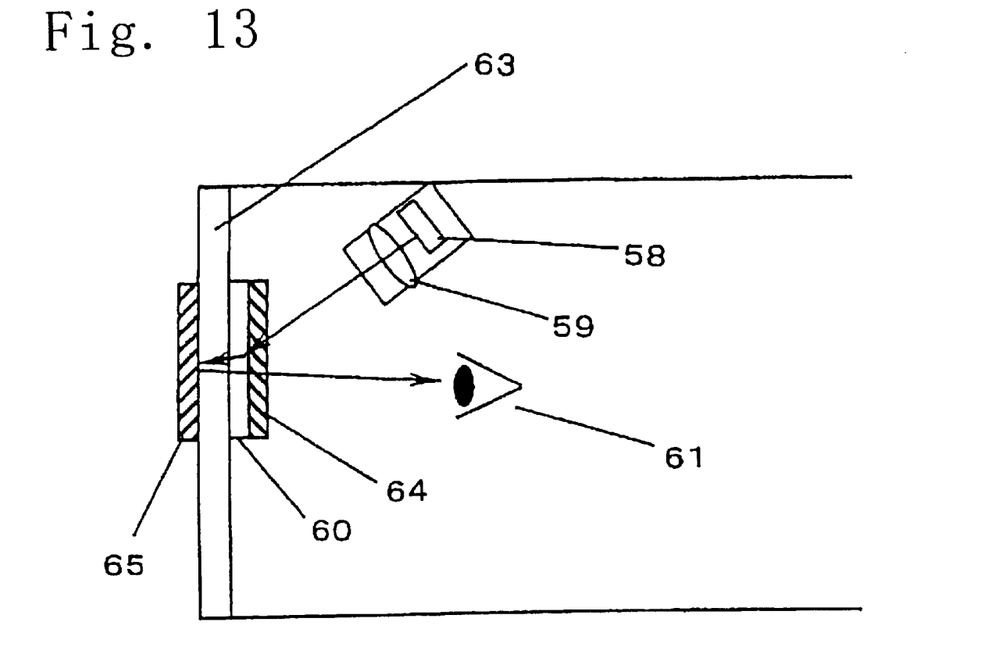
FIG. 13 is a cross-sectional view illustrating another example of a holographic display device employing a transmission diffusion hologram according to the present embodiment.

The hologram produced by exposure under the above condition 3 was irradiated with ultraviolet rays of 1,000 $mJ/cm^2$, followed by heat treatment at 120° C. for 2 hours to obtain a transmission diffusion hologram 60. The transmission diffusion hologram 60 thus produced was used for a glass of a show window which is another example of the holographic display device as illustrated in FIG. 13. In such a case, the transmission diffusion hologram 60 was attached to the interior side of a glass 63 of a show window, and the distance between a display element 58 on the ceiling and the glass 63 of a show window was made about 1,800 mm and the distance between an imaging optical component 59 consisting of a convex lens having a focal length of about 270 mm and the display element 58 was made about 300 mm, and the above imaging position correction was carried out, and the display image was observed under the following conditions 4. Here, the magnification of the display image was about 5 times.

Conditions 4

Angle of incidence from the display element 58 to the transmission diffusion hologram 60: about 45°

Angle of emission from the transmission diffusion hologram 60 to an observer 61: about 0°

Non-reflection coating on the observer side of the transmission diffusion hologram 60: $MgF_2$     High-reflection coating on the side opposite to the observer of the transmission diffusion hologram 60: Cr Further, in the present Example, in order to improve utilization ratio of light containing information from a display light source, a non-reflection coating 64 and a high-reflection coating 65 were provided on the sides opposite to the transmission diffusion hologram 60 and the glass 63 of a show window respectively, and accordingly an observer 61 could read the formed display image clearly.

According to the holographic display device of the present invention, when it is used for a vehicle, color of reflection toward the outside of the vehicle and complementary color toward the inside of the vehicle at a hologram installation portion of a window glass are eliminated, and a display device which is preferred in view of design and visual recognizability can be realized. Further, the external light noise can be reduced, such being favorable in view of safety when a wind-proof glass is used as a window glass.

Further, a hologram produced by diffused light alone as an incident light is easily applicable to color display since the diffraction wavelength width is wide.

Further, according to the present invention, in a case where the holographic display device is used for a wind-proof glass of a vehicle, halation due to an external light such as a headlight of a car coming from the opposite direction, can be prevented. Further, in a transmission diffusion hologram of a holographic display device, the visible light transmittance can be increased without decreasing the diffraction efficiency.

As mentioned above, a holographic display device with a good visual recognizability can be realized without inconvenience during observation.

The entire disclosures of Japanese Patent Application No. 2000-105318 filed on Apr. 6, 2000, Japanese Patent Application No. 11-129114 filed on May 10, 1999 and Japanese Patent Application No. 11-367327 filed on Dec. 24, 1999 including specifications, claims, drawings and summaries are incorporated herein by reference in their entireties.

What is claimed is:

1. A holographic display device which forms a display image of light containing information projected from a light-emitting display, on a diffusion hologram provided on a fixed substrate, the fixed substrate including a first surface on a side of the diffusion hologram facing the light-emitting display and a second surface on an opposite side of the diffusion hologram, wherein the diffusion hologram is a transmission diffusion hologram, and the display image transmission-wise diffracted by the diffusion hologram is reflected on the second surface of the fixed substrate for visual recognition.

2. The holographic display device according to claim 1, wherein the fixed substrate is a window glass of a vehicle.

3. The holographic display device according to claim 2, wherein a visible light transmittance is at least 70% when the transmission diffusion hologram is disposed on the fixed substrate.

4. The holographic display device according to claim 1, wherein the fixed substrate is a glass of a show window.

5. The holographic display device according to claim 4, further comprising a transparent substrate having a non-reflection coating applied to a side of the transmission diffusion hologram facing the first surface of the substrate.

6. The holographic display device according to claim 4, further comprising a high-reflection coating applied to the glass of a show window.

7. The holographic display device according to claim 1, wherein the hologram is a volume phase hologram and is recorded on an acrylic photopolymer.

8. The holographic display device according to claim 1, wherein the light-emitting display is a liquid crystal display element.

* * * * *